US012801367B2

(12) United States Patent
Wilhelmsson et al.

(10) Patent No.: US 12,801,367 B2
(45) Date of Patent: Nov. 17, 2026

(54) SCHEDULING VEHICLE SOFTWARE UPDATES

(71) Applicant: VOLVO TRUCK CORPORATION, Gothenburg (SE)

(72) Inventors: Martin Wilhelmsson, Gothenburg (SE); Johan Bjernetun, Mölnlycke (SE); Tobias Smidebrant, Gothenburg (SE); Linus Nordholm, Askim (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 206 days.

(21) Appl. No.: 18/173,438

(22) Filed: Feb. 23, 2023

(65) Prior Publication Data

US 2023/0273787 A1 Aug. 31, 2023

(30) Foreign Application Priority Data

Feb. 25, 2022 (EP) .................................... 22158982

(51) Int. Cl.
*G06F 8/65* (2018.01)
*B60W 60/00* (2020.01)

(52) U.S. Cl.
CPC ............... *G06F 8/65* (2013.01); *B60W 60/00* (2020.02); *B60W 2554/4023* (2020.02); *B60W 2554/4046* (2020.02); *B60W 2556/45* (2020.02)

(58) Field of Classification Search
CPC . G06F 8/65; B60W 60/00; B60W 2554/4023; B60W 2554/4046; B60W 2556/45
See application file for complete search history.

(56) References Cited

U.S. PATENT DOCUMENTS

| | | | | |
|---|---|---|---|---|
| 7,006,820 B1 * | 2/2006 | Parker | .................... | H04L 67/535 455/418 |
| 9,086,941 B1 * | 7/2015 | Siegel | ...................... | H04L 67/55 |

(Continued)

FOREIGN PATENT DOCUMENTS

| | | | | |
|---|---|---|---|---|
| CN | 113227967 A * | 8/2021 | ............... | G06F 8/65 |
| FR | 3057371 A1 | 4/2018 | | |
| WO | WO-2021133416 A1 * | 7/2021 | ............. | B60K 35/20 |

OTHER PUBLICATIONS

Anonymous: "Patch (computing)—Wikipedia", Feb. 22, 2022 (Feb. 22, 2022), pp. 1-10, XP093193206, Retrieved from the Internet:URL:https://en.wikipedia.org/w/index.php? title=Patch_(computing)&adid=1073335598.

(Continued)

*Primary Examiner* — Daxin Wu
(74) *Attorney, Agent, or Firm* — Jeffri A. Kaminski; Venable LLP

(57) ABSTRACT

A computer-implemented method for scheduling a vehicle software update in a vehicle, for example, in heavy-duty vehicle which may be operating in a defined area or site, and/or along a defined trajectory, the method comprising associating a probability of the vehicle having an updateable operational state with one or more time periods, wherein the probability of the vehicle being updateable is determined based at least partly on data representing behavioural states of one or more similar vehicles, in other words, other vehicles which have usage characteristics which have a relationship to the usage characteristics of the vehicle; scheduling a pending software update until the next time period of the one or more time periods where the probability of the vehicle having an updateable operational states meets a software update condition; and, enabling the vehicle to perform the software update when the vehicle probability (Continued)

having the updateable operational state meets the software update condition.

15 Claims, 5 Drawing Sheets

(56) References Cited

U.S. PATENT DOCUMENTS

| | | | | |
|---|---|---|---|---|
| 9,715,378 | B2 * | 7/2017 | Dickerson | G06F 8/65 |
| 2006/0075275 | A1 * | 4/2006 | Dini | H04L 43/0817<br>714/E11.02 |
| 2015/0169311 | A1 | 6/2015 | Dickerson et al. | |
| 2017/0123782 | A1 * | 5/2017 | Choi | G06F 8/65 |
| 2018/0107473 | A1 * | 4/2018 | Ahmed | G06F 8/654 |
| 2019/0114162 | A1 | 4/2019 | Izumi | |
| 2019/0259223 | A1 * | 8/2019 | Sangameswaran | G07C 5/0841 |
| 2020/0279443 | A1 * | 9/2020 | Kagami | G07C 5/008 |
| 2021/0191707 | A1 * | 6/2021 | Ullman | B60K 35/20 |
| 2021/0224056 | A1 * | 7/2021 | John | H04W 4/46 |
| 2022/0027143 | A1 * | 1/2022 | Fukuyo | H04L 67/34 |
| 2023/0158975 | A1 * | 5/2023 | Fang | B60R 16/023<br>701/36 |

OTHER PUBLICATIONS

European Communication pursuant to Article 94(3) EPC dated Aug. 20, 2024 in corresponding European Patent Application No. 23158284.2, 6 pages.

Extended European Search Report in corresponding European Application No. 22158982.3 dated Jul. 27, 2022 (9 pages).

* cited by examiner

SCHEDULING VEHICLE SOFTWARE UPDATES

TECHNICAL FIELD

The present disclosure relates to a method of scheduling software updates in a vehicle and to various related aspects. In particular, but not exclusively, to a computer-implemented method which predicts one or more time-periods when software updates can be performed based on the behavior of a similar heavy-duty vehicle, in other words, of another heavy-duty vehicle which has usage characteristics which have a relationship to the usage characteristics of the vehicle. A relationship between the usage characteristics may comprise the usage characteristics following the same trends over a 24 hour or 24/7 or longer time period. The disclosed technology may improve the operational efficiency of the vehicles as less time is spent updating the vehicle when it would normally be operating and also less time is spent on abortive vehicle updates.

In particular, but not exclusively the disclosed technology relates to a method of performing a software update in a vehicle in which the time to perform a software update is predicted by determining one or more time-based usage patterns of the vehicle, for example usage patterns in a defined area or site and/or along a defined trajectory. The usage patterns may comprise a single usage pattern for all usage of the vehicle or comprise one or more usage patterns involving specific sub-systems and/or processors of the vehicle.

The vehicle may be vehicles with automated driving systems, for example, an autonomous or semi-autonomous vehicle and/or a remote controlled vehicle. The vehicle may autonomously or semi-autonomously follow fixed trajectories but have a human operator for certain tasks or the vehicle may be more freely driven by a human driver but perform one or more tasks in an autonomous manner. The vehicle may be driven and operated by a human but have subsystems which rely on software which needs to be updated from time to time.

The disclosed technology is particularly useful for scheduling software updates of vehicles such as heavy-duty vehicles which are in operation for a high proportion of any 24 hour period, such vehicles being referred to as heavy-duty vehicles. Scheduling software updates of one or more heavy-duty vehicles is problematic as they may need to be taken off-line to have a software update which reduces their availability for their normal operations which results in a loss of efficiency on a site where one or more such vehicles are operating. The disclosed invention will be described mainly with respect to vehicles however, references to vehicles includes heavy-duty vehicles, such as semi-trailer vehicles, dumper trucks, forklift trucks and other types of heavy vehicles as well as cars which have an ADS configured to make tactical decisions.

A heavy-duty vehicle may comprise a wide range of different physical devices, such as combustion engines, electric machines, friction brakes, regenerative brakes, shock absorbers, air bellows, and power steering pumps. These physical devices are commonly known as Motion Support Devices (MSD). The MSDs may be individually controllable, for instance such that friction brakes may be applied at one wheel, i.e., a negative torque, while another wheel on the vehicle, perhaps even on the same wheel axle, is simultaneously used to generate a positive torque by means of an electric machine. The operation and control systems of a heavy-duty vehicle are accordingly more complex than the operation and control systems of a more light-weight vehicle such as a car.

BACKGROUND

Software is becoming an increasingly important part of the automotive industry. Since the software development within the automotive industry is evolving very quickly, any new vehicle can be expected to receive several new software updates during the complete vehicle lifetime. More and more vehicle products also support the capability to receive wireless software updates using telematics. However, known techniques for updating a vehicle with an automated driving system disable the vehicle so it is not operational whilst the automated driving system is being updated, this means that whenever a software update is performed on such a vehicle it does not remain operational.

To reduce the impact on operational efficiency at a site where there are several automated vehicles operating, it is known to update vehicles either all at the same time or to randomly select a vehicle to be updated so that a certain percentage of the vehicles operating on the site remain operational at any given time. However such known techniques do not, for example, take into account the type of vehicle being updated and/or the role of the vehicle operating on a site. Moreover, they are not able to distinguish between different types of software update, so updating an audio entertainment software component on a vehicle may result in the vehicle going offline and not performing its duties even though it is just the audio entertainment software component that is affected by the update.

U.S. Pat. No. 9,086,941 discloses a system and method for providing predictive software upgrades. Generally, the method comprising the steps of: querying a virtual vehicle application that simulates a real vehicle to determine one or more time period when the vehicle will be in an off state for long enough for updating of software to take place without the vehicle operating status being changed; transmitting a push notification to a user portable interactive communication device providing the one or more time periods determined, to the user for selection of one or more time period; receiving a selected one or more time period for upgrading of the software; transmitting a request for confirmation of a first of the one or more time period to the user portable interactive communication device at a predefined time period prior to the first of the one or more time period; and if the user confirms the first time period, instructing the upgrading of the vehicle control module by the vehicle at the first time period.

The disclosed technology seeks to mitigate, obviate, alleviate, or eliminate various issues known in the art which affect updating automated vehicles, especially automated heavy vehicles operating on a site, such as, for example, those mentioned above.

Summary Statements

Whilst the invention is defined by the accompanying claims, various aspects of the disclosed technology including the claimed technology are set out in this summary section with examples of some preferred embodiments and indications of possible technical benefits.

A first aspect of the disclosed technology relates to a computer-implemented method for scheduling a vehicle software update in a vehicle, the method comprising: associating a probability of the vehicle having an updateable operational state with one or more time periods, wherein the probability of the vehicle being updateable is determined based at least partly on data representing behavioural states of a plurality of other vehicles having a relation to the first vehicle in terms of vehicle usage characteristics, scheduling a pending software update until the next time period of the one or more time periods where the probability of the vehicle having an updateable operational states meets a software update condition, and, enabling the vehicle to perform the software update when the vehicle probability having the updateable operational state meets the software update condition, wherein the updateable operational state is a non-stationary behaviour state of the vehicle.

In some embodiments, the other vehicles having a relation to the first vehicle in terms of vehicle usage characteristics comprise vehicles of the same type, for example, they may be the same make and model of vehicle, for example, the other vehicles and the vehicle may be the same model of Volvo™ fork-lift trucks. In some embodiments, alternatively or in addition, the other vehicles having a relation to the first vehicle in terms of vehicle usage characteristics are performing the same role and/or tasks as the vehicle, for example, they may be performing the same type of tasks picking up and moving goods. In some embodiments, alternatively or in addition, the other vehicles having a relation to the first vehicle in terms of vehicle usage characteristics are following the same trajectory or route as the first vehicle, for example, the other vehicles and the vehicle may be travelling from A to B, via C.

Advantageously, by implementing the method, the likelihood of a vehicle having more uninterrupted and up-time when it is operational is increased as there is less likelihood of a software update being scheduled when the software of the vehicle to be updated would otherwise be in use. Also, updating the software when the vehicle is in the non-stationary behaviour state increases over-all time during which the vehicle can be in use. The non-stationary behaviour state may be a case when the vehicle is in use, and/or when the vehicle is executing a mission, and/or when the vehicle engine is active, and/or when the vehicle propulsion system is active, and/or when the vehicle is actively moving, and/or when the vehicle is operational and performs a task such as, e.g., driving and/or lifting and/or digging and/or unloading goods, etc. In general, updating software while the vehicle is in use is best done for function not currently used. For instance, for a vehicle with a crane, when the crane is used its software may not be updated. However, when the vehicle is moving but the crane is not in use, crane-related software may be updated.

In some embodiments, a plurality of pending software update time periods are scheduled. The plurality of pending software updates may be scheduled as a sequence of software update time periods. The plurality of pending software update time periods may correspond to updating a plurality of software modules to be updated, wherein one or more software modules are updated during one time period.

In some embodiments, the method is performed by the vehicle for which the software update is being scheduled, in which case the method may also comprise the vehicle notifying a remote server when it can download software. In some embodiments, instead or in addition, the method is performed by a remote server, and the method further comprises the server sending scheduling information indicating one or more time periods for a series of scheduled related software updates to the vehicle. An example of related software updates is when a number of different versions of software need to be updated in sequence to bring an old version of software to the latest version.

In some embodiments, a scheduled software update comprises a scheduled time period to perform a software download and to subsequently implement the update, for example, by executing code including the downloaded software to update the vehicle. In some embodiments, however, a scheduled software update comprises one or more separate scheduled time periods to download software from one or more separate time periods to execute the downloaded software and implement the software update on the vehicle. In some embodiments, the one or more time periods for the software download may be separated from the one or more time periods for the software update by hours. In some embodiments, the method may comprise scheduling of the software download periods and separately, scheduling of the software update periods. One or more time periods may be while the vehicle is operational and some time periods may be scheduled while the vehicle is not in use. By scheduling a plurality of time periods for updating a plurality of software modules, the over-all time when certain software modules are not in use is reduced and thereby usability of the vehicle is maximized.

In some embodiments, method is performed when the vehicle is operating in one or more of a defined area or site, which may be a confined or enclosed area or site. In some embodiments, the vehicle is travelling along a defined trajectory.

In some embodiments, an updateable operational state is a stationary behaviour state of the vehicle. In the stationary behavioural state the vehicle may be executing a mission. However, the updateable operational state may be a non-stationary behavioural state of the vehicle in some other embodiments. The non-stationary behavioural state may be a state when the vehicle is in use, and/or when the vehicle is executing a mission, and/or when the vehicle is operational and performs a task such as, e.g., driving and/or lifting and/or digging and/or unloading goods, charging, etc. In some embodiments, the non-stationary behavioural state may refer to a state when one or more modules of the operating system of the vehicle are used. In some embodiments, the non-stationary behavioural state may refer to a state when infotainment software is being used.

In some embodiments, wherein a vehicle having a relationship with the first vehicle in terms of vehicle usage characteristics is one or more of a same type of vehicle, a vehicle having a same or similar role to the vehicle, and a vehicle following a same or similar trajectory or route as the vehicle. For example, in embodiments where the vehicles are heavy-duty vehicles which have assigned roles comprising tasks to perform on a defined area and/or along a defined trajectory, the method may advantageously reduce the amount of time that the vehicles are not fully operational due to having a software update. Typically, during the software update, functions of the vehicle which use the updating software may not be available, while all other vehicle functions which do not use the updating software may be fully utilized. In some embodiments, there are software modules suitable for updates during the non-stationary behavioural state. These modules may be non-essential for operation of a particular vehicle type (vehicle type may, e.g., be autonomous driving vehicle type, non-autonomous driving type of vehicle, hybrid type of vehicle, chargeable vehicle, etc.). In some embodiments, there are software modules non-suitable for updates during the non-stationary behavioural state. These modules may be essential for operation of a particular type of vehicle. Software modules suitable for updates may be defined depending on a type of vehicle, and like-wise, software modules non-suitable for updates can also be defined depending on a type of vehicle. For instance, software modules used by safety systems, directly and/or indirectly, may belong to a category of software modules non-suitable for updates during the non-stationary behavioural state. These modules are typically updated when the vehicle is stationary. If the vehicle has a back-up memory, these modules may be updated on the back-up memory while switching from a primary memory to the back-up memory may be scheduled according to the method of the present disclosure. In some examples, software modules used by driving-related systems, e.g. brakes, steering, etc., may also require a stationary state. In some examples, e.g. for autonomous type of vehicle, navigation software and/or databases for maps may also belong to a category of software modules non-suitable for updates during the non-stationary behavioural state while for other types of vehicles, e.g. non-autonomous type of vehicle, navigation software may also belong to a category of software modules suitable for updates during the non-stationary behavioural state. For instance, for cranes, software modules controlling lifting systems may also be non-suitable for updates during vehicle's use. In some examples, software modules used by a charging system, may be non-suitable for updates while the vehicle is charging. In some examples, downloading an update for modules non-suitable for update during non-stationary state may occur during the non-stationary state while an actual execution of the update may be scheduled for times when the vehicle is in the stationary state, as an update typically requires a restart of the software/software module. In general, when scheduling software updates, the method may comprise a step of determining a probability when a vehicle software component is not in use while the vehicle is operational. For instance, functions for which related software may be updated while the vehicle is operational, e.g. moving, are PTO related components on the vehicle that only uses PTO while the vehicle is standing still (e.g. a crane), infotainment, databases for maps, Alco lock software, alarm, camera software for the rear camera, etc.

In some embodiments, the probability of the vehicle having an updateable operational state is determined at least partly based on collected data indicative of vehicle use. In some embodiments the method further comprises processing the collected data to determine one or more usage characteristics of the vehicle.

In some embodiments, the vehicle is a heavy-duty vehicle in use for at least 70% of any given time-period over which vehicle use is assessed.

In some embodiments, the probability of the vehicle having an updateable operational state is determined dynamically at least partly based on receiving a user input within one or more previous time-periods.

In some embodiments, the method further comprises: determining the type of system subsystems and/or software components that the vehicle software update will use on the vehicle, associating each type of system subsystem and/or software components with one or more different software component groups of the vehicle, wherein each software component group has an assigned set of conditions which need to be fulfilled in order to proceed with the software update, and associating the probability of the vehicle having an updateable operational state with one or more time periods based on when the time periods when the assigned set of conditions for each software component group used by the software update are fulfilled. The assigned set of conditions may relate to and be defined based on the above-described essential and non-essential software modules for operating the vehicle.

In some embodiments, the software components may be clustered, for example, into groups with the same priority. In some examples there may also be mandatory dependencies which require simultaneous or batch installation. For example, if a software components or software component group relies on an updated software version of another component or group, the software of the other component or group should be updated first as otherwise the second software component or group may not be properly configured after its update, in which case either the updates should be made in parallel (i.e. simultaneous) or in a properly sequenced update.

In some embodiments, an updateable operational state is a non-stationary behaviour state of the vehicle associated with the software component group(s) used by the vehicle software update. In some examples, the software component group may relate to, e.g. temperature control in the vehicle, navigation, infotainment, etc.

In some embodiments, the selection condition for selecting a probability of the vehicle having an updateable operational states comprises a condition that the probability has a value exceeding a threshold probability value and/or a condition that value is associated with a confidence score above a threshold confidence score.

Another, second aspect of the disclosed technology comprises an apparatus for scheduling vehicle software updates, the apparatus comprising: computer code; memory; and at least one processor, wherein the at least one processor is configured to execute the computer code when loaded from the memory to cause the vehicle control system to execute a method according to the first aspect or any one of the disclosed method embodiments.

In some embodiments, the apparatus comprises a remote system from one or more vehicles for which the remote system is configured to schedule vehicle software updates.

In some embodiments of the remote system, the remote system comprises a server or server system remote from a defined area or site within which the one or more vehicles are operating in use. In some embodiments of the apparatus, the one or more vehicles are travelling along a defined trajectory in use which is remote from the system.

In some embodiments, the scheduling takes into account predicted availability of bandwidth to download software to each of the one or more vehicles so that the software is available on the vehicle to perform the vehicle software update at the scheduled time.

Another, third, aspect of the disclosed technology comprise a system for scheduling vehicle software updates, the system comprising: an apparatus according to the second aspect or any of its disclosed embodiments, and one or more vehicles configures to provide behavioural state data to the apparatus, wherein the apparatus is configured to process the received behavioural state data when performing the method according to the first aspect or any of the disclosed method embodiments to schedule a vehicle software update for one or more of the vehicles.

In some embodiments, the vehicles operate in a defined area or site. In addition or instead, in some embodiments, the vehicles operate along a defined trajectory. In some embodiments, the defined area or site is a confined or enclosed area or site.

Another, fourth aspect of the disclosed technology comprises a computer program product comprising computer program code, wherein when the computer program code is executed by one or more processors or processing circuitry of an apparatus, the computer program code causes the apparatus to perform a method according to the first aspect.

The computer program product may be provided in some embodiments as a computer program carrier.

A fifth aspect of the invention comprises a computer program carrier carrying a computer program product according to the fourth aspect, wherein the computer program carrier is one of an electronic signal, optical signal, radio signal or computer-readable storage medium.

Another, sixth, aspect of the disclosed technology comprises a heavy-duty vehicle comprising an automated-driving system, wherein the heavy-duty vehicle is configured to provide behavioural state data to an apparatus according to the second aspect or any of the disclosed apparatus embodiments. In some embodiments, the heavy-duty vehicle is operating in a defined or confined site or area and/or is travelling along a defined trajectory when the vehicle provides the behavioural state data to the apparatus.

In some embodiments, the heavy-duty vehicle is configured to perform a software update of one or more vehicle software components at a time scheduled by the apparatus.

A seventh aspect of the invention comprises a computer-readable storage medium comprising computer-program code which, when executed by one or more processors or processing circuitry of an apparatus, causes the apparatus to implement a method according to the first aspect.

The disclosed aspects and embodiments may be combined with each other in any suitable manner which would be apparent to someone of ordinary skill in the art.

BRIEF DESCRIPTION OF THE DRAWINGS

Some embodiments of the disclosed technology are described below with reference to the accompanying drawings which are by way of example only and in which.

DETAILED DESCRIPTION

Figure 1:
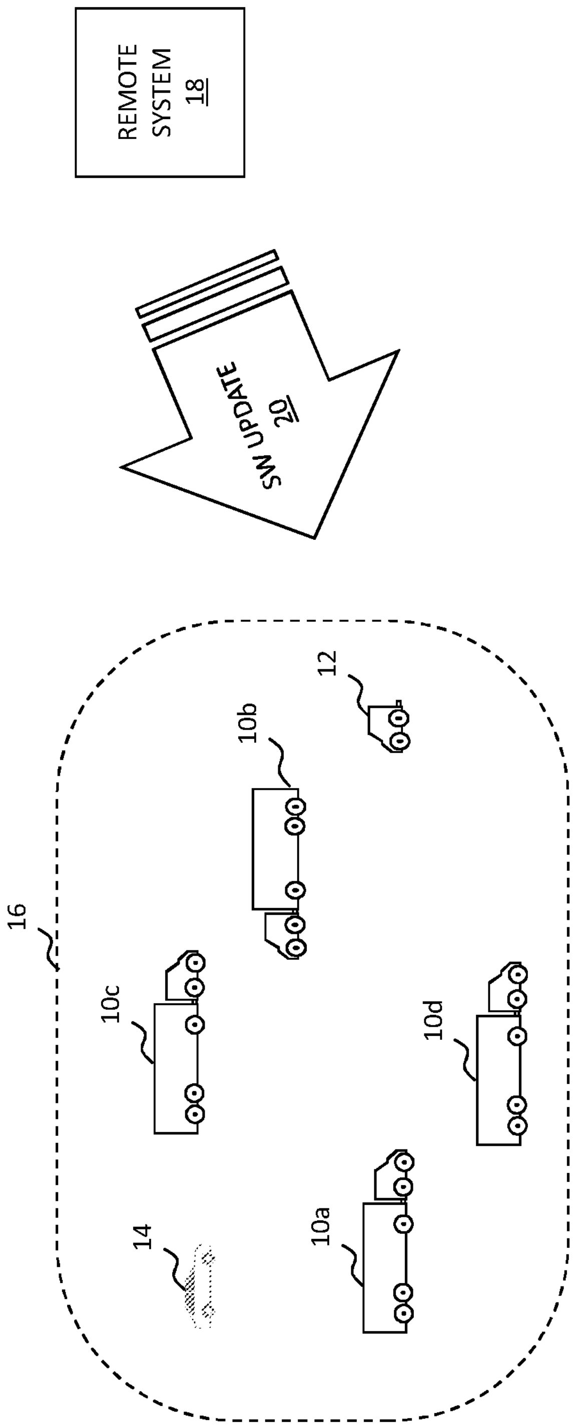
FIG. 1 schematically illustrates an automated vehicle operating area where a method of updating vehicle software is implemented according to some embodiments of the disclosed technology.

Aspects of the present disclosure will be described more fully hereinafter with reference to the accompanying drawings. The apparatus and method disclosed herein can, however, be realized in many different forms and should not be construed as being limited to the aspects set forth herein. Steps, whether explicitly referred to a such or if implicit, may be re-ordered or omitted if not essential to some of the disclosed embodiments. Like numbers in the drawings refer to like elements throughout.

The terminology used herein is for the purpose of describing particular aspects of the disclosure only, and is not intended to limit the disclosed technology embodiments described herein. As used herein, the singular forms "a", "an" and "the" are intended to include the plural forms as well, unless the context clearly indicates otherwise.

FIG. 1 shows an example of an area or site 16 or autonomous operating zone where vehicles, for example, automated vehicles such as, autonomous or semi-autonomous or remote controlled vehicles such as heavy-duty vehicles, are operating. These are shown as vehicles 10, 12, 14 in FIG. 1. Examples of vehicles 10, 12, 14 which are heavy-duty vehicles include fork-lift trucks, dumpers, cabs and trailers, which may follow one or more predetermined trajectories and/or which have assigned roles to perform on a site. Each vehicle 10*a,b,c,d* operating in the site may be assigned a particular role which differs from the roles followed by the other types of vehicles operating on the site, for example, they may be configured to follow different trajectories and/or perform different operations at different locations and/or transport different types of goods between different locations. FIG. 1 also shows a remote system 18 which may be located on the site, for example, as a central site server or central site unit or the like, or which may be located off-site. As shown in FIG. 1, remote system 18 is configured to provide software updates 20 to one or more of the vehicles 10*a,b,c,d*, 12, 14 operating on the site 16.

Figure 4:
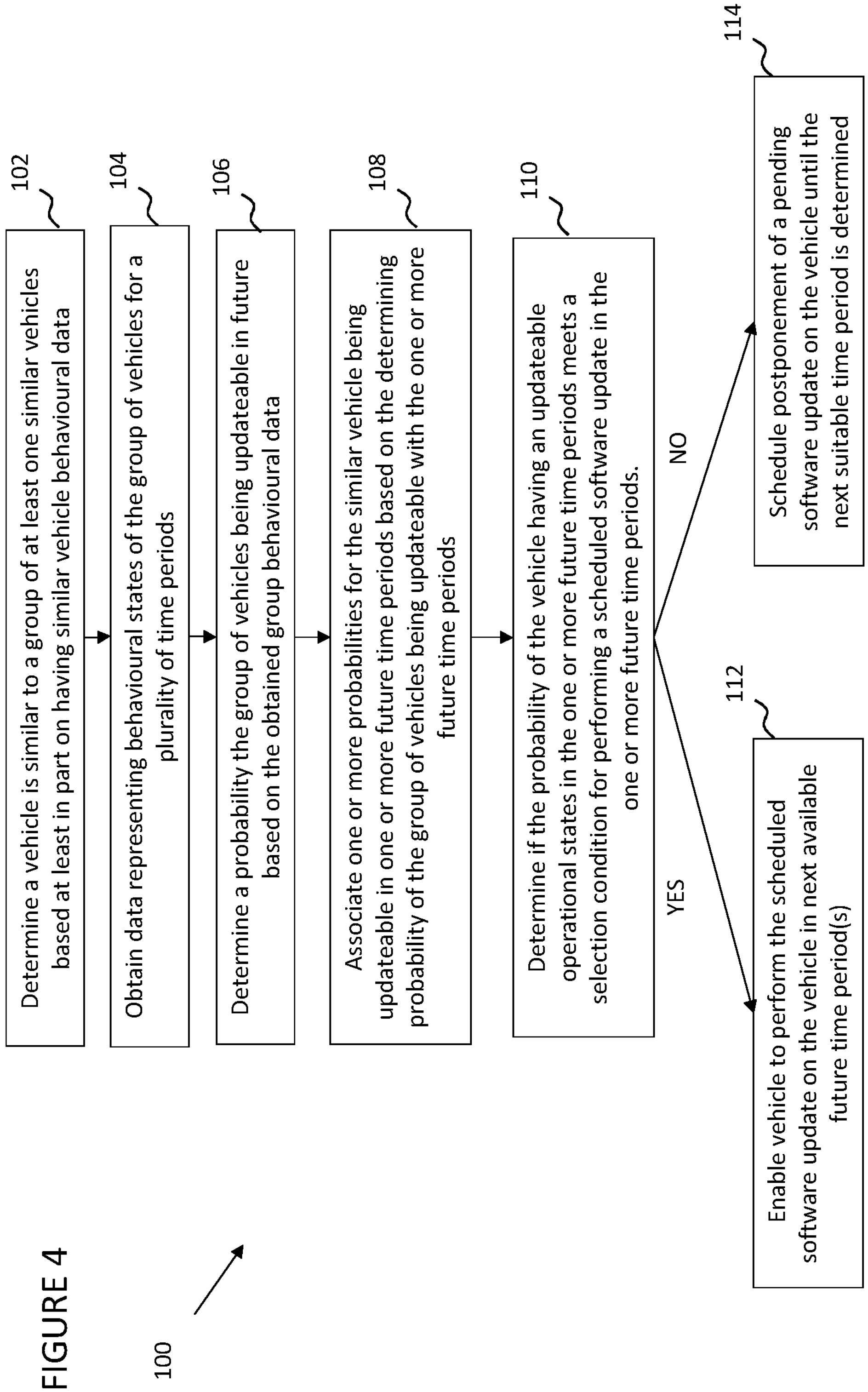
FIG. 4 schematically illustrates a method of performing a software update in a vehicle (10, 12, 14) according to some embodiments of the disclosed technology.

The remote system 18 of the disclosed technology is configured to perform a computer-implemented method 100 to schedule a software update in a vehicle 10, 12, 14, for example, a heavy-duty vehicle. Such vehicles often operate in defined areas, for example, in sites such as construction sites, harbours, and mines or the like. They may also have defined trajectories, which may or may not be in a defined area. The defined area or site may be confined, in other words and enclosed, area or site in some embodiments. FIG. 4 shows an example embodiment of the method 100 and is described in more detail later below.

In some embodiments, however, instead or in addition, to the remote system or server 18 performing method 100, the vehicle 10, 12, 14 to be updated performs the method 100 to schedule when it updates its software. The scheduled software update may schedule downloading the software and installing the downloaded software on the vehicle in one time-period or it may schedule a plurality of time-periods which may include one or more separate time-periods for downloading software and one or more separate time-periods when the downloaded software is installed (during which the vehicle operation may be disrupted). In some embodiments, during these different periods operation of some of the vehicle functions may be disrupted.

In the embodiments shown in FIG. 1, the remote system associates 108 a probability of the vehicle 10, 12 14 having an updateable operational state with one or more time periods where the probability of the vehicle being updateable is determined based at least partly on data representing behavioural states of at least one similar vehicle, where a similar vehicle is a vehicle having one or more usage characteristics which have a relationship to one or more usage characteristics of the vehicle. The remote system 18 then schedules 110 a pending vehicle software update until the next time period of the one or more time periods in which the probability of the vehicle having an updateable operational state meets a software update condition. When the probability of the vehicle having the updateable operational state meets the software update condition, the remote system 18 is configured to enable the vehicle to perform the software update. The software update may include downloading the software to the vehicle in some embodiments. In other embodiments, the software update is previously downloaded to the vehicle, but the software update is not executed on the vehicle until scheduled using the method.

An example of a software update condition is to require the probability for the vehicle having the updateable operational state to be above a threshold probability value. Another example of a software update condition requires a confidence score for the probability of the vehicle to be in the updateable operational state being above the threshold probability value to be above a threshold confidence score.

The probability may be provided in some embodiments as a parameter between a minimum value and a maximum value which indicates the estimated chance of a software update being successfully implemented on the vehicle. In some embodiments, the probability may be provided as a discrete list of ordered numbers. By scheduling software updates on a vehicle by vehicle basis on a site based on their behavioural history, in other words, their usage patterns on the site, the availability of vehicles 10,12,14 on the site to perform their operational duties on the site due may be increased or improved. The behavioural history may comprise one or more usage pattern(s) over a particular time period, for example, the historic behavioural state of a vehicle if monitored over a week or more may indicate for any particular 24 hour period if the vehicle is being used at all or not used at all, a particular time of day and if not used, how long the vehicle will not be in use. This use of the vehicle allows a software update to be performed within one or more time periods for which the vehicle is not in use and by scheduling updates to be performed based on the usage patterns of the vehicle, it is possible to perform a software update when is least likely to affect the normal operation of the vehicle in any 24 hour period (or other time period if a different time period is used). In some examples, updating of some safety modules can be scheduled when the vehicle is not in use, while other modules can be updated during use of the vehicle.

In some embodiments, however, the behavioural state data may comprise more than one usage pattern of a vehicle to distinguish between types of usage and/or being which internal components of the vehicle are being used. This allows a vehicle which has one or more vehicle subsystems which can be isolated from the remaining vehicle subsystems to be updated whilst the remaining vehicle subsystems remain operational. The behavioural state information may be remotely analysed in some embodiments to allow an operational role performed by a vehicle on a site to be associated with usage of one or more vehicle subsystems. This may allow, in some embodiments of the invention, the vehicle to continue to perform one or more tasks associated with its role or roles on a site whilst any software components which are not used to perform those tasks are updated. For instance, if the vehicle is a non-stationary behavioural mode, e.g. in a driving mode, any software components which are involved with the driving may not be suitable for updates while one or more software components (e.g. software related to charging, software related to the alarm system, etc.) may be suitable for an update during driving, and their updates may be scheduled during the driving mode. In another example, if the vehicle is in a charging mode, e.g. parked at a charging station, any software components which are involved with the charging may not be suitable for updates as this software will most likely be in use, while a plurality of other software components not related to charging may be suitable for updates, and their updates may be scheduled. In yet another example, when the vehicle has e-highway charging, i.e. charging from the road while driving, it may not be suitable to update related software while the vehicle is moving/driving.

In some embodiments, the data representing behavioral states may be collected from a vehicle and analyzed by the remote system 18 but in some embodiments, the data representing behavioral states which is remotely analyzed by the remote system 18 is data representing the behavior of a number of vehicles in excess of one. Behaviors can then be determined using data from vehicles which share certain vehicle characteristics, for example, they may be the same type of vehicle or be vehicles performing the same role on the same site or on different sites. Examples of sites include construction sites or mines, however, the method may be used for other types of sites and off-site, for example, it may be used to schedule software updates for vehicles which are following off-site repeated trajectories and/or performing off-site repeated tasks as part of their assigned roles. For instance, a non-stationary fork-lift crane may operate the crane and all software modules that are not directly and/or indirectly involved with the operation of the crane can be updated. In a non-stationary behavioral state the vehicle may be in a driving mode and driving critical features may not be updated, while all other software modules not related to the driving function may be updated. Software modules related to breaking, steering etc. may therefore not be updated, while, e.g. alarm software, if not in use, can be updated, navigation, if not in use can be updated, infotainment can be updated, etc.

In some embodiments of the method 100, the method further comprises: maintaining different groups of software component classes representing the computer programs to be updated and determining suitable time periods for update of each group of software components according to one or more software update conditions. For example, if a software update relates only to an audio subsystem, the vehicle's other sub-systems which are not affected by the update can continue to operate as usual whilst the audio sub-system is updated. In some embodiments, the software update relates only to one or more functions of a heavy-duty vehicle. When the heavy-duty vehicle receives new software over a wireless telematics link from the remote server and is about to perform the actual update, it is very important that the system has sufficient time available to perform the complete software update before the heavy duty vehicle is needed again. For instance, safety critical features (e.g. locking system, airbags, etc.) of the vehicle may be updated during this time period while other features, which are not safety related (e.g. infotainment, air condition, etc.) nor driving-critical can be updated while the vehicle is in use. Driving critical features may relate to systems for brakes, steering wheel, etc. The need to use the vehicle again may be scheduled or unscheduled use, for example, it may be demand dependent if the vehicle is autonomous or semi-autonomous or remote controlled. A semi-autonomous vehicle has a human driver, for example, it may be an automated or remote-controlled semi-autonomous vehicle. If such a vehicle starts a software update routine and its driver would like to start the vehicle and potentially depart during the time of the ongoing software update, or if the vehicle is autonomous and configured to respond to external conditions which suddenly trigger a need for the vehicle to be used, then the vehicle would not be available despite being needed. For instance, in an autonomous driving vehicle, a navigation software is one of driving-critical features and update of the navigation software may not be performed while the vehicle is in a driving mode. In another type of vehicle, e.g. a non-autonomous vehicle, the navigation software is not a driving-critical feature and may be updated any time, e.g. during driving or during use of the vehicle.

This will create problems and whilst the vehicle downtime may sometimes be unavoidable, in some situations if a software update is updating one or more but not all of the software components used by the vehicle at any one time, then some embodiments of the disclosed method of scheduling a software update advantageously selectively cause the vehicle subsystems to be updated so that the remaining software components which are not being updated at that time and any subsystems that use those software components them remain functional. As the rest of the vehicle's software components remain on-line and functional any of the operations and tasks that involve those sub-systems of the vehicle are not affected by the software update of the software components which they do not use or which are not essential for some use of the vehicle sub-systems. This allows the vehicle to remain in use in some situations where it might otherwise be completely off line and unavailable for use if all software components were taken off-line despite the software update being only for some software components.

In order to minimize the risk that a driver of such a vehicle, which may be a heavy-duty vehicle, would like to depart during the time of an ongoing software update, and in particular a software update of driving-critical features and/or safety-critical features, or, for an autonomous vehicle, that the vehicle may be desired to be called into action during a software update of driving-critical features or safety-critical features, the disclosed methods of scheduling a software update of driving-critical features or safety-critical features identifies, for example by using statistically techniques, time periods where the vehicle is normally standing still and is not being used during a prolonged time period. The identified behavioral time pattern can then be used to schedule when the software update of the of driving-critical features and/or safety-critical features of the vehicle should take place.

Figure 2:
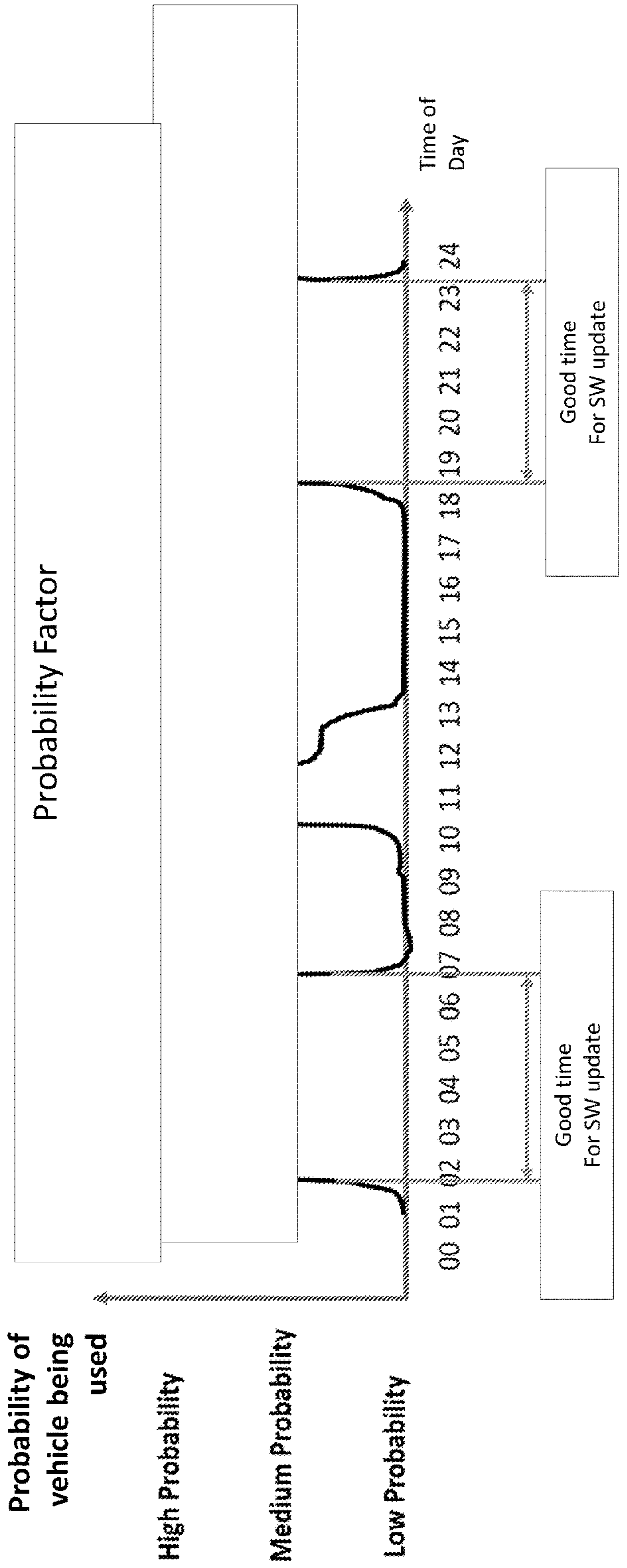
FIG. 2 schematically illustrates an example of how a vehicle being operated varies over a 24 hour period affects optimal timing for performing a software update.

FIG. 2 of the accompanying drawings illustrates by way of example of a probability for a vehicle to be standing still and not being used for a long time as an example of usage can be used to determine a behavioural pattern of the vehicle which can be used to schedule a software update of driving-critical features and/or safety-critical features of the vehicle. As shown in FIG. 2, the probability of the vehicle not being used is represented by an adaptive factor value (Y-axis), where a high value represents a high probability that the vehicle will be standing still and not being used during a sufficiently long time to perform a software update. On the X-axis, the values represent the clock time for that specific weekday. Features other than those which are driving-critical and/or safety-critical can be scheduled when the vehicle is non-stationary, i.e. when the vehicle is in use and executing a mission.

In some embodiments, the resulting type of pattern could be performed separately for every weekday, so that different weekdays can have different time-based patterns. For example, during weekends it is reasonable to believe that the usage pattern will often look different in comparison to how the usage pattern is for a regular weekday.

In some embodiments, the actual method for evaluation of every point in time, for example, is performed by analysing how large part of a specific time window (as shown in the example of FIG. 2, between 8:00-9:00 in the morning) that the analysed parameter such as engine power is zero. If the engine power is always zero during the full hour between 8:00-9:00, then this may be considered a strong indicator that 8:00-9:00 is a good time to perform a software update, and in particular a software update of driving-critical features and/or safety-critical features, or systems relating to engine usage, whereas other some systems, such as alarm system may not be suitable for updates. The adaptive factor for the time window between 8:00-9:00 is then, for example, incremented step wise. For every evaluation where the engine power has been zero during the full hour, the factor used to represent that time of the day is incremented with one, until it reaches some maximum value. If the engine power has not been zero during the full hour, then the factor for that specific time is, for example, instead reduced by one or potentially completely reset to zero.

The above example is just one of many possible time resolutions, and in other embodiments of the disclosed technology, any suitable time resolution could be used, ranging from seconds to hours. It is also possible to have other types of time references than clock time, such as the accumulated time from when the vehicle arrives to a specific location, for example the vehicle home base where it for example may often spend long resting times over night.

In some embodiments, the vehicle is a heavy-duty vehicle and the different software components of the heavy-duty vehicle are organized into groups, where each group has an assigned set of conditions which need to be fulfilled in order to proceed with the software update. For instance, updating of the infotainment system of a heavy-duty vehicle may be performed also during normal vehicle operation, while an update to the vehicle safety systems always requires a stationary heavy-duty vehicle, or any other vehicle, and may require the vehicle to be parked in a particular safe location.

Some embodiments of the disclosed methods, identify during which times of the day and which day of the week a heavy-duty vehicle is most likely standing still and is not being used, based on statistical/historical data. Some embodiments of the disclosed method, identify during which times of the day and which day of the week a heavy-duty vehicle is most likely not using one or more software modules, based on statistical/historical data.

In some embodiments, the input data source used to identify these times is, for example, one or more of: vehicle power usage, vehicle speed, engine speed, GPS data or any other available parameter relating to active vehicle usage. The identified times in some embodiments are used to adapt a function, where for example, an adaptive factor is related to each point in time during the day, and for each day of the week. The adaptive factor is adjusted to correctly represent the probability that the vehicle will be non-operational and standing still during a sufficiently long time to successfully perform a software update (typically ranging between a few minutes up to a few hours). In some embodiments, the adaptive factor is adjusted to correctly represent the probability that the vehicle will be operational, but not using one or more software modules, during a sufficiently long time to successfully perform an update of one or more software modules (typically ranging between a few minutes up to a few hours).

In some embodiments, when a vehicle software update is requested by the vehicle control system, after having received the new software update over a wireless telematics link, the vehicle control system will use the data contained within the adaptive function to analyze when the optimal time to perform the software update is. In other words, a different adaptive function is provided by the remote system 18 to each vehicle 10, 12, 14 operating in a site which receives the same software update, and the adaptive function is used to adjust when each vehicle performs that software update.

In some embodiments, when the identified optimal point in time for a software update is reached, the system can automatically initiate the software update of the vehicle and perform the update without any need for driver interaction.

In some embodiments, when the driver subsequently arrives at the vehicle, or when certain functions are needed during operation, the software has now already been updated and the driver can immediately start to benefit from the new features that the new software revision will provide.

Figures 3A, 3B, 3C:
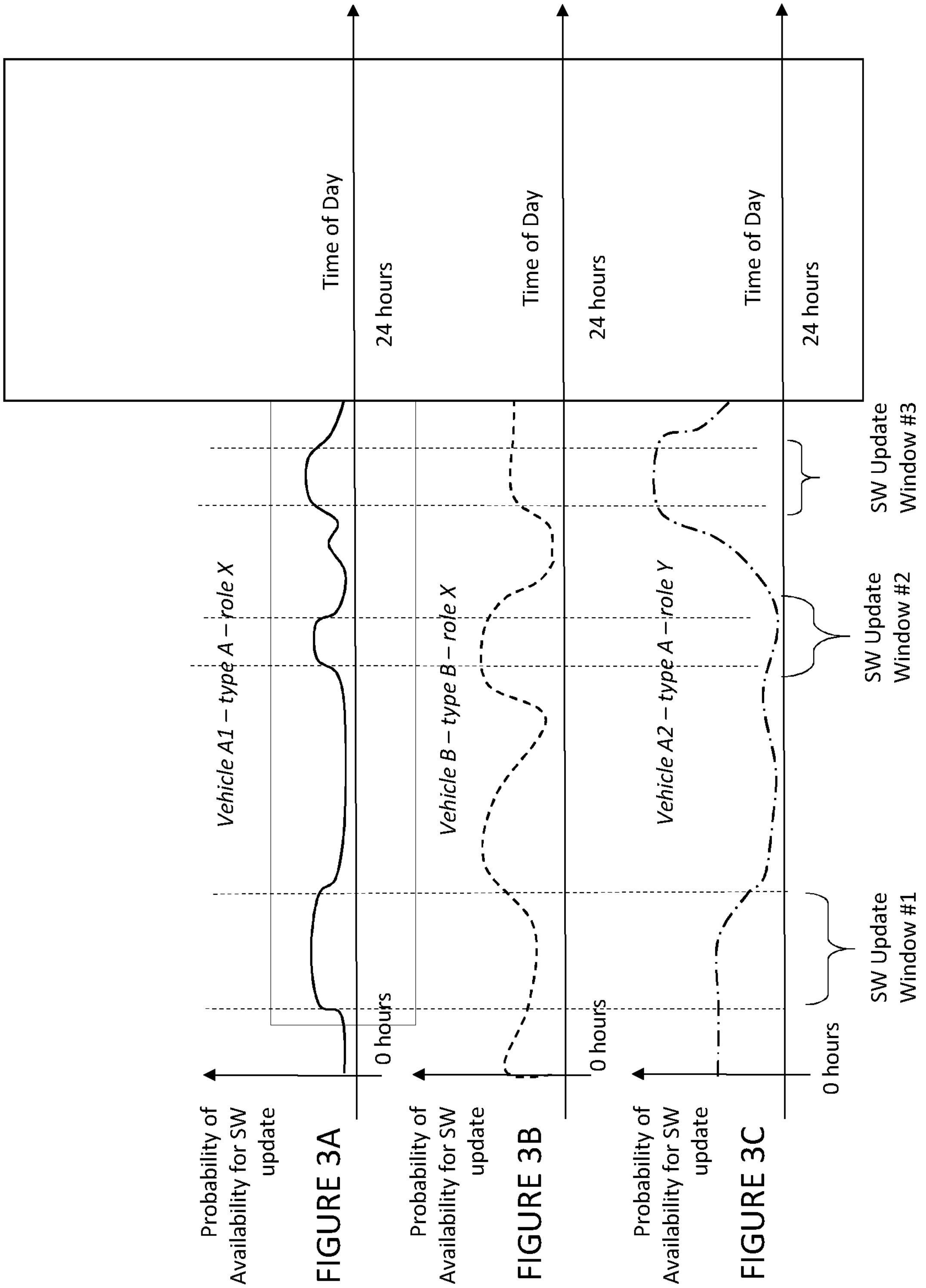
FIGS. 3A to 3C schematically illustrate examples of how a vehicle's type and/or the vehicle's role can affect identifying the optimal timing for performing a software update according to some embodiments of the disclosed technology.

FIGS. 3A to 3C of the accompanying drawings shows an example of three possible software update windows being determined for a group of three vehicles operating on a particular site based on the historic probability of each vehicle being available for an update.

FIG. 3A shows the probability of availability for a software update of a first vehicle A1 which is a first type A, and performs role X on the site over a 24 hour period.

FIG. 3B shows the probability of availability for a software update of another vehicle B over a 24 hour period. Vehicle B is also of a different type to vehicle A1, but performs the same role X on the site.

FIG. 3C shows the probability of availability for a software update of another vehicle A2 over a 24 hour period. Vehicle A2 is the same type of vehicle as vehicle A1, but performs a different role Y on the site.

The alignment of the probability of availability for a software updates for these three example vehicles shows that there are three possible windows for the site vehicles to be updated. Software window #1 is suitable for vehicles A1 and A2 but not so suitable for vehicle B. Software window #2 is suitable for vehicles A1 and B but not so suitable for vehicle A2. Software window #3 is suitable for all three vehicles A1, A2, and B to be updated. This window may be useful if all of the vehicles need to be updated at the same time.

Determining what types of vehicles can be updated and what roles the vehicles are performing is particularly useful for heavy vehicles which may be potentially in operation 24/7 on a site such as a mining site or the like. Moreover, it allows a more speedy update of some types of software which, for example, may be needed to update only certain types of vehicle or vehicles which perform a particular role. By determining the likely probable windows for a vehicle which is performing a particular role and/or is of a particular type, if a new vehicle arrives on the site, its optimal update times can be determined based on the probability for software update availability of the other vehicles having that role and of that type which are already operating on the site.

In some embodiments, the identified predictive data for the specific vehicle is identified within that specific vehicle and is also only used locally, in that specific vehicle.

In some embodiments, the identified predictive data is transferred using telematics to a server and/or to another vehicle which could benefit from the same data, for example if a customer has bought a new vehicle which is intended to be used in the exact same transport mission as the previous vehicle.

In some embodiments, based on the identified predictive data, a driver of a vehicle could in advance be asked if a certain time of the day could be good to perform the software update, in order to increase the robustness of the prediction even more.

FIG. 4 of the accompanying drawings illustrates a method 100 of performing a software update in a vehicle (10, 12, 14) according to some of the disclosed embodiments. The method 100 comprises determining a vehicle is similar to a group of at least one other vehicle, in other words, determining the vehicle has one or more usage characteristics which have a relationship to one or more usage characteristics of the group of at least one other vehicle. The relationship may be based on the vehicle and the at least one other vehicle having the same or similar vehicle characteristics, for example the vehicles may be the same type of vehicle (such as have the same body type, such as being fork-lift trucks, or cranes, or dumper trucks, or harvesters etc.). The type of vehicle may also instead or in addition include the make and model of a vehicle in some embodiments. A similar type of vehicle may accordingly be the same type of vehicle but a different make and/or model number of vehicle. So by way of example, a Toyota™ and a Volvo™ fork-lift truck are similar types of vehicles whereas two Volvo™ fork-lift trucks are the same type of vehicle. Examples of different types of heavy-duty vehicles include a forklift truck, or a digger or a dumper, or a crane or the like. The usage characteristic relationship may also be based on the other vehicles and the vehicle performing the same or a similar role on a site, for example, they may all be used to move something from location A to location B, if the goods moved are the same, the vehicles have the same role, but if the locations are different, for example, one moves goods from A to B2, then the vehicles have similar roles. Two vehicles moving different goods from the same locations A to B could also in some examples being considered to have similar roles.

If the other vehicles have the same or similar roles to the vehicle, this could also result in the usage characteristics of such vehicles having a relationship even though the vehicles are different types of vehicles. For example, a vehicle of type A could be assigned to move rocks from X to Y and so the role of this vehicle would be the same or similar to another vehicle of type B also assigned to move rocks from X to Y.

The other vehicles may operate in the same defined area or site and/or operate along the same defined trajectory within a defined area or site or travel along the same route, which may not be within a defined area, in some embodiments. The defined area or site may be a confined area or site, for example, an autonomous operating zone, AOZ in some embodiments. This may also result in the same or similar usage characteristics, for example, vehicle A travelling from X to Y with a rest stop at Z and vehicle B travelling from X to Y with a rest stop at Z could have similar usage characteristics, even if they are very different types of vehicles and/or have different roles.

The method 100 further comprises obtaining data representing the state of one or more monitored vehicle characteristic for a plurality of time periods, for example, for 15 minute intervals over a 24 hour period. The data may be obtained over a daily, weekly or longer period to allow for seasonal characteristics to be determined when the data is analysed. As shown in FIG. 4, the method comprises obtaining data representing behavioural states of the group of vehicles for a plurality of time periods 104. A probability the group of vehicles is updateable in future within a window comprising one or more time periods based on the obtained group behavioural data is then obtained 106. In some embodiments, the update window may be determined instead or additionally for a sub-group comprising one or vehicles of the group of vehicles. In some embodiments, the method comprises obtaining data representing behavioural states of one or more vehicle's systems and/or functions for a plurality of time periods 104. A probability that software related to the one or more vehicle's systems and/or functions is updateable in future within a window comprising one or more time periods based on the obtained behavioural data is then obtained in 106.

The method also comprises associating one or more probabilities for the vehicle being available for a software update in one or more future time periods based on the determined probability of the group of other vehicles which have usage characteristics which have a relationship to the usage characteristics of the vehicle, being updateable with the one or more future time periods 108. The group may comprise, in some embodiments for example all of the vehicles operating in the same or a similar site or area or which are travelling along the same or similar trajectory (or route) as the vehicle but in some embodiments, for example, the group may comprise the vehicles with the same or similar role and/or of the same type operating in the same or a similar site or area or which are travelling along the same or similar route and/or trajectory to the vehicle in some embodiments. In other words, taking the examples of FIGS. 3A to 3C, some embodiments of the method allow the optimal time to update any one of vehicles A1, A2, or B or a group of two or more of these vehicles to be predicted based on the data collected from all of the vehicles by determining the probability for the group of vehicles. The probability of the vehicle having an updateable operational states in the one or more future time periods meeting a selection condition for performing a software update is then determined 110. The software update is then scheduled based on the probability of the vehicle being in a suitable state, in other words, having an appropriate usage condition, to perform the update (in other words to start the update and complete it before certain vehicle functions would, based on its vehicle usage characteristics, be likely to be used again. If the selection condition is met, then the software update on the vehicle is performed in next available future time period(s) 112. If the selection condition is not met, then the method comprises scheduling a pending software update on the vehicle until the next time period 114. In some embodiments, the software update may include downloading the update software to the vehicle and executing the software to configure the vehicle with the updated software, but in some embodiments the scheduling may just schedule when the vehicle is to execute downloaded software to configure the vehicle with updated software.

In some embodiments accordingly, once the behavioural data has been collected, method 100 comprises associating (108) a probability of a vehicle having an updateable operational state with one or more time periods. Examples of operational states include an operational state of being stationary (not being driven/autonomously driving) another may be an active operational state such as if a vehicle has a grab arm to load/unload something although the vehicle itself is stationary. wherein the probability of the vehicle being updateable is determined based at least partly on data representing behavioural states of a plurality of similar vehicles, in other words, the other vehicles which have usage characteristics which have a relationship to the usage characteristics of the vehicle, and scheduling a pending software update until the next time period of the one or more time periods where the probability of the vehicle having an updateable operational states meets a selection condition, for example, where the probability has a value exceeding a threshold probability value and/or that value is associated with a confidence score above a threshold confidence score. When the selection period is met, the software update is performed.

In some embodiments of the method 100, an updateable operational state for, e.g. driving critical software and safety software is by default a stationary behaviour state of the vehicle. Other examples of updateable operational states for other systems however may not be stationary vehicle states. For example, if only some software is going to be updated, e.g. media centre, then the updateable operational state may be a non-stationary behavioural state of the vehicle.

The probability of the vehicle having an updateable operational state is determined at least partly based on collected data indicative of vehicle use, where the vehicle use data is processed to provide usage, for example, behavioural, characteristics for a vehicle. The vehicle use may be the use of the vehicle for which a software update is being scheduled in some embodiments but in some embodiments data indicative of the use of other vehicles having the same or a similar role and/or of the same or similar type, and may include in some cases vehicles operating in the same site or a similar site may be used instead or in addition. Examples of sites, could be mines, harbours, airport or railway goods depot, etc., etc. Two vehicles which operate on different mines could still be operating on similar sites and so have similar usage characteristics if they perform the same role in their respective sites. By way of example, other vehicles which follow the same trajectory as the vehicle may be considered to have a similar role if they also perform similar tasks along the same trajectory. In some embodiments the method further comprises processing collected data from one or more vehicles to determine one or more usage characteristics of each vehicle.

The method may be used for a variety of different types of vehicles, including large commercial vehicles such as heavy duty vehicles. The vehicle may be a heavy-duty vehicle for example, a heavy duty vehicle which is in use for the majority of any defined period over which usage characteristics are measured, for example, for more than 50% of any 24 hour period, 7 days a week. In some embodiments, the vehicle is a heavy-duty vehicle in use for at least 70% of any given time-period over which vehicle use is assessed. The method may allow such vehicles, particularly vehicles which are utilised at various time-points over any 24 hour period to be updated with less impact on their availability for normal operations.

In some embodiments, probability of the vehicle having an updateable operational state is determined dynamically at least partly based on receiving a user input within one or more previous time-periods. In some embodiments, the probability may be affected by the type of user input in terms of which software components on the vehicle are used responsive to the user input.

In some embodiments, the method further comprises determining the type of software components of the software update will use on the vehicle, associating each type of software component with one or more different software component groups of the vehicle, wherein each software component group has an assigned set of conditions which need to be fulfilled in order to proceed with the software update, and associating the probability of the vehicle having an updateable operational state with one or more time periods based on when the time periods when the assigned set of conditions for each software component group used by the software update are fulfilled. An updateable operational state may comprise a stationary vehicle state where the vehicle is not driven or not autonomously driven.

In some embodiments, an updateable operational state is a non-stationary behaviour state of the vehicle associated with the software component group(s) used by the vehicle software update. In other words, an updateable operational state may comprise a variety of different states, as if only some software is going to be update, e.g. a media centre, then the updateable operational state of the vehicle is a non-stationary behavioural state of the vehicle. The non-stationary behaviour state may be a case when the vehicle is in use, and/or when the vehicle is executing a mission, and/or when the vehicle is operational and performs a task such as, e.g., driving and/or lifting and/or digging and/or unloading goods, etc.

In some embodiments of the method, the selection condition for selecting a probability of the vehicle having an updateable operational states comprises a condition that the probability has a value exceeding a threshold probability value and/or a condition that value is associated with a confidence score above a threshold confidence score.

In some embodiments, the method schedules a plurality of software update time periods to perform a software update. The plurality of pending software updates may be scheduled as a sequence of software update time periods.

In some embodiments, the method 100 is performed by the vehicle for which the software update is being scheduled. In other words, the vehicle will have access to its own behavioural/operational state information and/or receive behavioural/operational state information for other vehicles (which may be anonymised information for data protection purposes) which will allow it to determine when it will have time-periods during which it could perform one or more software updates. In some embodiments, however, instead or in addition, the method 100 is performed by a remote server or system, for example, the remote system, and the method further comprises the server sending scheduling information indicating one or more time periods for a series of scheduled related software updates to the vehicle. An example of related software updates is when a number of different versions of software need to be updated in sequence to bring an old version of software to the latest version.

In some embodiments, a scheduled software update comprises a scheduled time period to perform a software download and to subsequently implement the update, for example, by executing code including the downloaded software to update the vehicle. In some embodiments, however, a scheduled software update comprises one or more separate scheduled time periods to download software from one or more separate time periods to execute the downloaded software and implement the software update on the vehicle.

In some embodiments, a scheduled time period comprises a scheduled software download period which is based on predicted availability of bandwidth at a predicted location of the vehicle to download software to each of the one or more vehicles so that a software download will be available on the vehicle to perform the vehicle software update at the scheduled installation time.

Figure 5:
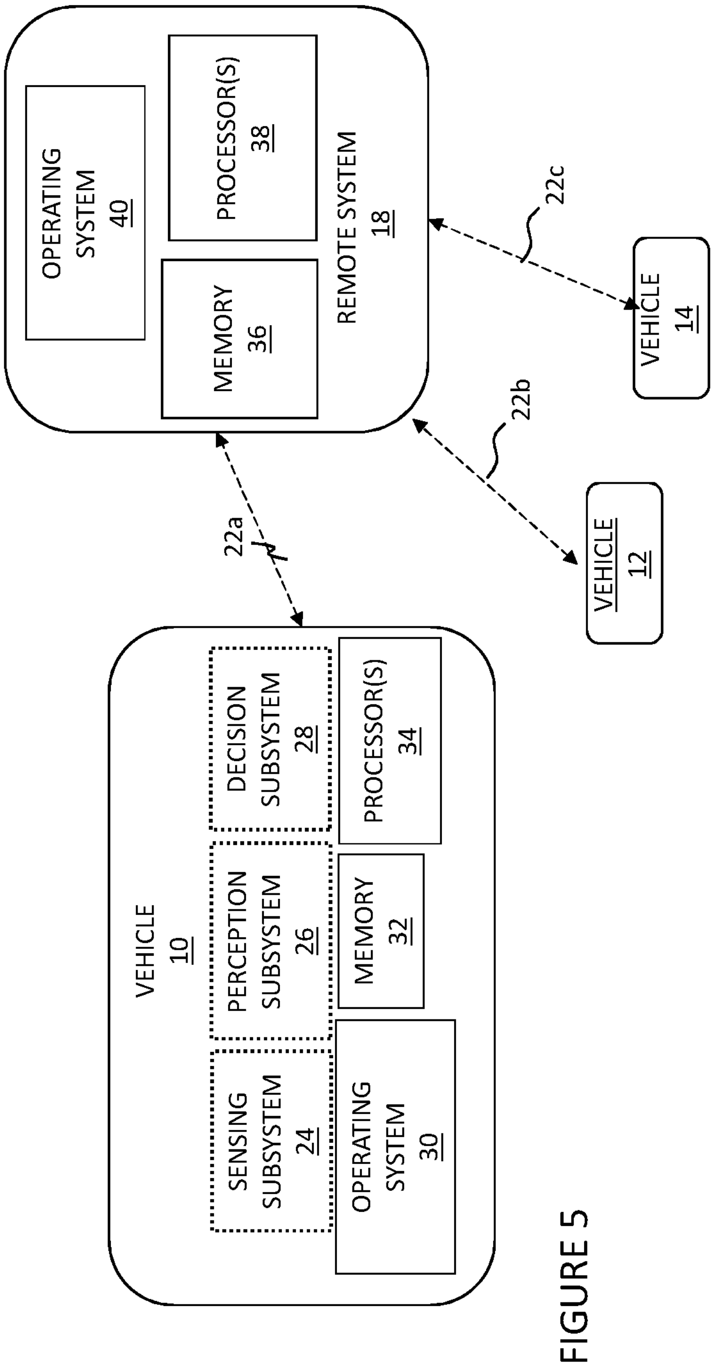
FIG. 5 schematically illustrates a system for implementing the disclosed methods on a site according to some embodiments of the disclosed technology.

FIG. 5 shows schematically an example system comprising apparatus configured to implement the method 100 shown in FIG. 4 and described herein above where the method of scheduling a vehicle software update is implemented by a remote system 18. In some embodiments, the apparatus for scheduling vehicle software updates comprises computer code, memory and at least one processor and the at least one processor is configured to execute the computer code when loaded from the memory to cause the vehicle control system to execute a method 100, for example, an embodiment of the method shown in FIG. 4 or according to any of the embodiments of method 100 described herein. In some embodiments, the apparatus comprises a remote system 18 from the vehicle 10, 12, 14 which is operating in a defined site, or travelling along a defined trajectory. In some embodiments, however, the method may be implemented by one of the vehicles 10, 12, 14 so that the vehicle schedules its own vehicle software updates. In the latter case, the vehicles may schedule an update based on their own behavioural history in some embodiments, or based on a comparison of their own behavioural and/or operational state data with other similar vehicles. In other words, the other vehicles which have usage characteristics which have a relationship to the usage characteristics of the vehicle, if they are able to access this.

As shown in FIG. 5, the remote system 18 comprises an operating system 40, memory 36, processing circuitry or processor(s) 38, and a suitable data interface (not shown) to receive behavioural state data from each of the vehicles 10, 12, 14. One or more or all of the processors or processing circuitry 38 are configured to process the received behavioural state information to determine when each of vehicles sending the information is likely to be in an operational state where a software update can be performed. In this way, by performing an embodiment of the method of scheduling a vehicle software update, each of the vehicles 10, 12, 14 may be updated either independently of the other vehicles. Each of the vehicles 10, 12, 14 is provided with a vehicle control system which includes an automated driving system, ADS comprising a suitable sensing subsystem 24, a perception subsystem 26 and a decision subsystem 28 as shown in FIG. 5. The vehicle control system may use or include an operating system 30, memory 32 which comprises computer code, and processor(s) 34. The processor(s) 34 are configured to execute the computer code when loaded from the memory 32 to cause the vehicle control system to obtain the vehicle behavioural state information which is sent via the wireless communication links 22*a*, 22*b*, 22*c* to remote system 18 in some embodiments, but which could also be transferred using a different system of communication, for example, via a memory stick, or physical connection in other embodiments. The remote system 18 then processes the received behavioural state data so that it is able to determine the probabilities of each vehicle being available for a software update, for example, as shown schematically in FIG. 2, and also in FIGS. 3A, 3B, and 3C. In some embodiments, the analysis performed by the remote system 18 may also determine, based in the behavioural data received, when one or more specific subsystems of the vehicle are available for a software update. In some embodiments, one or more specific subsystems of each vehicle are updated individually but in some embodiments, the software updates for a plurality of vehicles may be coordinated, for example, it may occur synchronously. In some embodiments, the memory may comprise a plurality of different memory modules, including modules located on other network nodes in some embodiments. In some embodiments, two parallel memory areas or partitions within the control units of the vehicle may be utilized. The software may be running on a first memory partition. The software update may take place in a second partitions and when the complete installation is performed, the system may switch over to the updated memory partition. In this implementation, even driving-critical and safety critical software can be updated while the vehicle is non-stationary. The method may comprise a step of scheduling switching of the software from the first memory to the second memory to thereby perform the software update when the vehicle probability having the updateable operational state meets the software update condition. Having a back-up memory minimizes the time span in which the vehicle should not use one or more functions utilizing a software.

The operating system of each vehicles comprises various software components and/or drivers for controlling and managing general system tasks (e.g., memory management, storage device control, power management, etc.) and may also include components which control communication internally between various hardware and software components of that vehicle. The vehicles 10, 12, 14 may comprise autonomous heavy-duty vehicles, semi-autonomous heavy-duty vehicles or remote controlled heavy-duty vehicles operating on the same site or area in some embodiments, but the remote system 18 may be configured to perform a method of scheduling a vehicle software update for any type of vehicle with an automated control system in other embodiments.

Some, if not all, of the above embodiments may be implemented using computer program code which may be provided as software or hardcoded, for example, as a computer program product configured to be used by a device mounted on or integrated in a vehicle. In some embodiments, the computer program product comprises computer-code which when executed by one or more processors of the vehicle, causes the vehicle to implement a method of scheduling a vehicle software update according to any one of the disclosed embodiments.

For example, the methods described above may be at least partly implemented through one or more processors, such as, the processors or processing circuitry shown as processor(s) 38 in FIG. 5 together with computer program code for performing the functions and actions of the embodiments herein. The computer program code may be provided in the form of software and hardware, and the software updates are configured to update the computer code.

The software code which when executed by the remote system 18 causes the method for scheduling a vehicle software update to be performed may and be automatically up-mentioned above may also be provided as a computer program product, for instance in the form of a data carrier carrying computer program code which can be then stored locally in the remote system 18 in memory 36 and then loaded and executed by the processing circuitry or processors 38. The data carrier, or computer readable medium, may be one of an electronic signal, optical signal, radio signal or computer-readable storage medium.

The computer program code software update may e.g. be provided as pure program code which is downloaded as a data carrier signal or otherwise provided to a vehicle control unit by remote system 18. Thus, it should be noted that the functions of the remote system 18 may in some embodiments be implemented as computer programs stored in memory 36, for example, a computer readable storage unit, for execution by processors or processing modules, e.g. the processing circuitry 38.

Those skilled in the art will also appreciate that the processing circuitry or processor(s) 38 and the memory or computer readable storage unit 36 described above may refer to a combination of analog and digital circuits, and/or one or more processors configured with software and/or firmware, e.g. stored in a memory, that when executed by the one or more processors such as the processor(s) or processing circuitry 36 perform as described above. One or more of these processors 36, as well as the other digital hardware, may be included in a single application-specific integrated circuit (ASIC), or several processors and various digital hardware may be distributed among several separate components, whether individually packaged or assembled into a system-on-a-chip (SoC). In some embodiments, the systems to be updated may be embedded systems. Software running on the embedded systems may be scheduled for updates only when the system is not in use. In particular, both, downloading a software update and executing the update may be performed while the embedded systems are not in use. The vehicle may be non-stationary, i.e. in use, while some of the embedded systems are not in use.

The remote system 18 also comprises a transceiver/receiver or control unit which is capable of controlling how signals are sent and/or received wirelessly via a suitable transmitter/receiver antenna arrangement to each of the vehicles 10, 12, 14.

The communication channels between the vehicles 10, 12, 14 and the remote system 18, which may in some embodiments be a site office or fleet back office or the like, may be point-to-point, or networks, for example, over cellular or satellite networks which support wireless communications. The wireless communications may conform to one or more public or proprietary communications standards, protocols and/or technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

Where the disclosed technology is described with reference to drawings in the form of block diagrams and/or flowcharts, it is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

The description of the example embodiments provided herein have been presented for the purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements, features, functions, or steps than those listed and the words "a" or "an" preceding an element do not exclude the presence of a plurality of such elements, features, functions, or steps. It should further be noted that any reference signs do not limit the scope of the claims, that the example embodiments may be implemented at least in part by means of both hardware and software, and that several "means", "units" or "devices" may be represented by the same item of hardware.

The various example embodiments described herein are described in the general context of methods, and may refer to elements, functions, steps or processes, one or more or all of which may be implemented in one aspect by a computer program product, embodied in a computer-readable medium, including computer-executable instructions, such as program code, executed by computers in networked environments.

A computer-readable medium may include removable and non-removable storage devices including, but not limited to, Read Only Memory (ROM), Random Access Memory, RAM), which may be static RAM, SRAM, or dynamic RAM, DRAM. ROM may be programmable ROM, PROM, or EPROM, erasable programmable ROM, or electrically erasable programmable ROM, EEPROM. Suitable storage components for memory may be integrated as chips into a printed circuit board or other substrate connected with one or more processors or processing modules, or provided as removable components, for example, by flash memory (also known as USB sticks), compact discs (CDs), digital versatile discs (DVD), and any other suitable forms of memory. Unless not suitable for the application at hand, memory may also be distributed over a various forms of memory and storage components, and may be provided remotely on a server or servers, such as may be provided by a cloud-based storage solution. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The memory used by any apparatus whatever its form of electronic apparatus described herein accordingly comprise any suitable device readable and/or writeable medium, examples of which include, but are not limited to: any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry.

Memory may store any suitable instructions, data or information, including a computer program, software, an application including one or more of logic, rules, code, tables, etc. and/or other instructions capable of being executed by processing circuitry and, utilized by the apparatus in whatever form of electronic apparatus. Memory may be used to store any calculations made by processing circuitry and/or any data received via a user or communications or other type of data interface. In some embodiments, processing circuitry and memory are integrated. Memory may be also dispersed amongst one or more system or apparatus components. For example, memory may comprises a plurality of different memory modules, including modules located on other network nodes in some embodiments.

In the drawings and specification, there have been disclosed exemplary aspects of the disclosure. However, many variations and modifications can be made to these aspects which fall within the scope of the accompanying claims. Thus, the disclosure should be regarded as illustrative rather than restrictive in terms of supporting the claim scope which is not to be limited to the particular examples of the aspects and embodiments described above. The invention which is exemplified herein by the various aspects and embodiments described above has a scope which is defined by the following claims.

The invention claimed is:

1. A computer-implemented method for scheduling a vehicle software update in a first vehicle, the method comprising:

determining a type of system subsystems and/or software components that the vehicle software update will use in the vehicle;

associating the type of system subsystem and/or software components with one or more different software component groups of the vehicle, wherein each software component group has an assigned set of conditions which need to be fulfilled in order to proceed with the software update;

associating a probability of the first vehicle having an updateable operational state with one or more time periods, wherein the probability of the first vehicle being updateable is determined based at least partly on data representing behavioural states of one or more other vehicles having a relation to the first vehicle in terms of vehicle usage characteristics, and wherein associating the probability further comprises, for each software component group used by the vehicle software update, determining whether the assigned set of conditions for the software component group is fulfilled during a respective time period, wherein the assigned set of conditions comprise that the software component group is not in use during the respective time period;

scheduling a pending software update until the next time period of the one or more time periods where the probability of the first vehicle having an updateable operational state meets a software update condition; and, determining that the probability meets the software update condition;

performing the software update to the first vehicle while the probability of having the updateable operational state meets the software update condition, wherein the updateable operational state is a non-stationary behaviour state of the first vehicle, wherein the non-stationary behaviour state of the first vehicle indicates that the first vehicle is in motion.

2. The computer-implemented method of claim 1, wherein the vehicle operates in or along one or more of:

a defined area or site;

a confined or enclosed area or site; and a defined trajectory.

3. The computer-implemented method of claim 1, wherein a vehicle which has a relation to the first vehicle in terms of one or more vehicle usage characteristics is one or more of:

a same or similar type of vehicle;

a vehicle having a same or a similar role to the vehicle; and a vehicle following a same or similar trajectory or route to the vehicle.

4. The computer-implemented method of claim 1, wherein the probability of the vehicle having an updateable operational state is determined at least partly based on collected data indicative of vehicle use and wherein the method further comprises:

processing the collected data to determine one or more usage characteristics of the vehicle.

5. The computer-implemented method of claim 1, wherein the probability of the vehicle having an updateable operational state is determined dynamically at least partly based on receiving a user input within one or more previous time-periods.

6. The computer implemented method as claimed in claim 1, wherein associating the probability of the first vehicle having the updateable operational state with the one or more time periods further comprises:

maintaining an adaptive factor value for each of the one or more time periods;

for each of the one or more time periods, determining a time period during which at least one software module associated with the vehicle software update is not in use;

incrementing the adaptive factor value for the time period; and determining the probability based on the adaptive factor value, wherein the adaptive factor value represents the probability that the first vehicle is operational and not using the at least one software module.

7. The computer-implemented method of claim 1, wherein the updateable operational state is associated with the software component group(s) used by the vehicle software update.

8. The computer implemented method as claimed in claim 1, wherein the selection condition for selecting a probability of the vehicle having an updateable operational states comprises a condition that the probability has a value exceeding a threshold probability value and/or a condition that value is associated with a confidence score above a threshold confidence score.

9. Apparatus for scheduling vehicle software updates, the apparatus comprising:

computer code;

memory; and at least one processor;

wherein the at least one processor is configured to execute the computer code when loaded from the memory to cause the vehicle control system to execute a method according to claim 1.

10. Apparatus according to claim 9, wherein the apparatus comprises a remote system from a site comprising one or more vehicles for which the remote system is configured to schedule vehicle software updates.

11. A system for scheduling vehicle software updates, the system comprising:

an apparatus according to claim 9; and one or more vehicles configured to provide behavioural state data to the apparatus, wherein the apparatus is configured to process the received behavioural state data when performing the method to schedule a vehicle software update for one or more of the vehicles.

12. A system according to claim 11, wherein the vehicles operates in or along one or more of:

a defined area or site;

a defined trajectory; and a confined or enclosed area or site.

13. A non-transitory computer-readable storage medium storing instructions which, when executed by at least one processor, cause the at least one processor to perform operations according to claim 1.

14. A heavy-duty vehicle comprising an automated-driving system, wherein the heavy-duty vehicle is configured to provide behavioural state data to an apparatus according to claim 9.

15. The heavy-duty vehicle of claim 14, wherein the heavy-duty vehicle is configured to perform a software update of one or more vehicle software components at a time scheduled by the apparatus.

* * * * *